United States Patent
Jiang (10) Patent No.: US 8,045,607 B2
(45) Date of Patent: Oct. 25, 2011

(54) METHOD APPLIED TO AN EQUALIZER FOR REDUCING ISI AND RELATED ISI REDUCTION APPARATUS

(75) Inventor: Jeng-Shiann Jiang, Tainan County (TW)

(73) Assignee: Himax Technologies Limited, Fonghua Village, Xinshi Dist., Tainan (TW)

( * ) Notice: Subject to any disclaimer, the term of this patent is extended or adjusted under 35 U.S.C. 154(b) by 916 days.

(21) Appl. No.: 12/033,877

(22) Filed: Feb. 19, 2008

(65) Prior Publication Data

US 2009/0207898 A1 Aug. 20, 2009

(51) Int. Cl.
*H03H 7/30* (2006.01)
*H04L 25/08* (2006.01)
*H04N 5/00* (2011.01)

(52) U.S. Cl. ........ 375/232; 375/229; 375/231; 375/233; 375/346; 375/348; 348/607; 348/610

(58) Field of Classification Search .......... 375/231–233; 348/607, 614
See application file for complete search history.

(56) References Cited

U.S. PATENT DOCUMENTS

| | | | | |
|---|---|---|---|---|
| 6,693,958 B1* | 2/2004 | Wang et al. | ................... | 375/232 |
| 7,038,731 B2* | 5/2006 | Tsuie | .................. | 348/607 |
| 7,860,157 B2* | 12/2010 | Yang et al. | ................... | 375/233 |
| 2004/0037354 A1* | 2/2004 | Jayaraman et al. | ........... | 375/229 |
| 2006/0176947 A1* | 8/2006 | Lim | ................ | 375/232 |
| 2007/0104264 A1* | 5/2007 | Park et al. | ................ | 375/233 |
| 2010/0074320 A1* | 3/2010 | Park et al. | ................ | 375/233 |

* cited by examiner

*Primary Examiner* — Khanh C Tran
*Assistant Examiner* — Eboni Hughes
(74) *Attorney, Agent, or Firm* — Winston Hsu; Scott Margo (57) ABSTRACT

A method applied to an equalizer includes receiving an input data-stream having a training sequence component with a first number of symbols and a data component with a second number of symbols, wherein the first number plus the second number equals a third number; when a symbol number is not greater than the first number, training the training sequence component to generate a first trained coefficient set; when the symbol number is between the first number and the third number, recycling the training sequence component to generate a recycled training sequence component, and training the recycled training sequence component to generate a second trained coefficient set; storing the input data-stream to generate a delayed input data-stream when the symbol number is not greater than the third number; and applying the second trained coefficient set to the equalizer when the symbol number is greater than the third number.

19 Claims, 6 Drawing Sheets

| | Time=$t_0$ | Time=$t_1$ | Time=$t_2$ |
|---|---|---|---|
| Input data-stream | $D_{t0}$ | $D_{t1}$ | $D_{t2}$ |
| Channel | $H_{t0}$ | $H_{t1}$ | $H_{t2}$ |
| Coefficients of equalizer | $G_{t0}$ | $G_{t1}$ | $G_{t2}$ |

| $f_d$(Hz) | No data recycling | Conventional data recycling | Data recycling of the present invention |
|---|---|---|---|
| 0 Hz | o | o | o |
| 10 Hz | Fail | o | o |
| 20 Hz | Fail | Fail | o |
| 40 Hz | Fail | Fail | o |
| 80 Hz | Fail | Fail | o |

FIG. 6

METHOD APPLIED TO AN EQUALIZER FOR REDUCING ISI AND RELATED ISI REDUCTION APPARATUS

BACKGROUND OF THE INVENTION

1. Field of the Invention

The present invention relates to a method applied to an equalizer and related apparatus, and more particularly, to a method applied to an equalizer and related apparatus for reducing inter-symbol interference (ISI) by using a storage to store a training sequence component and a data component of an input data-stream during training the training sequence component.

2. Description of the Prior Art

Conventional digital television broadcasting formats include the Advanced Television Systems Committee (ATSC) format in the United States, the Digital Video Broadcasting-Terrestrial (DVB-T) format in Europe, and the Integrated Services Digital Broadcasting-Terrestrial (ISDB-T) format in Japan. Due to multi-path channels existing during signal transmission, inter-symbol interference (ISI) is therefore generated. An adaptive equalizer, such as a decision feedback equalizer (DFE), is typically adopted in ATSC receivers for reducing ISI. However, a training sequence component of an ATSC signal is not long enough to guarantee operations of the adaptive equalizer. So a technique called data recycling is used for reusing the training sequence component of the ATSC signal for several times, thereby reducing convergence time of the adaptive equalizer.

Figure 1:
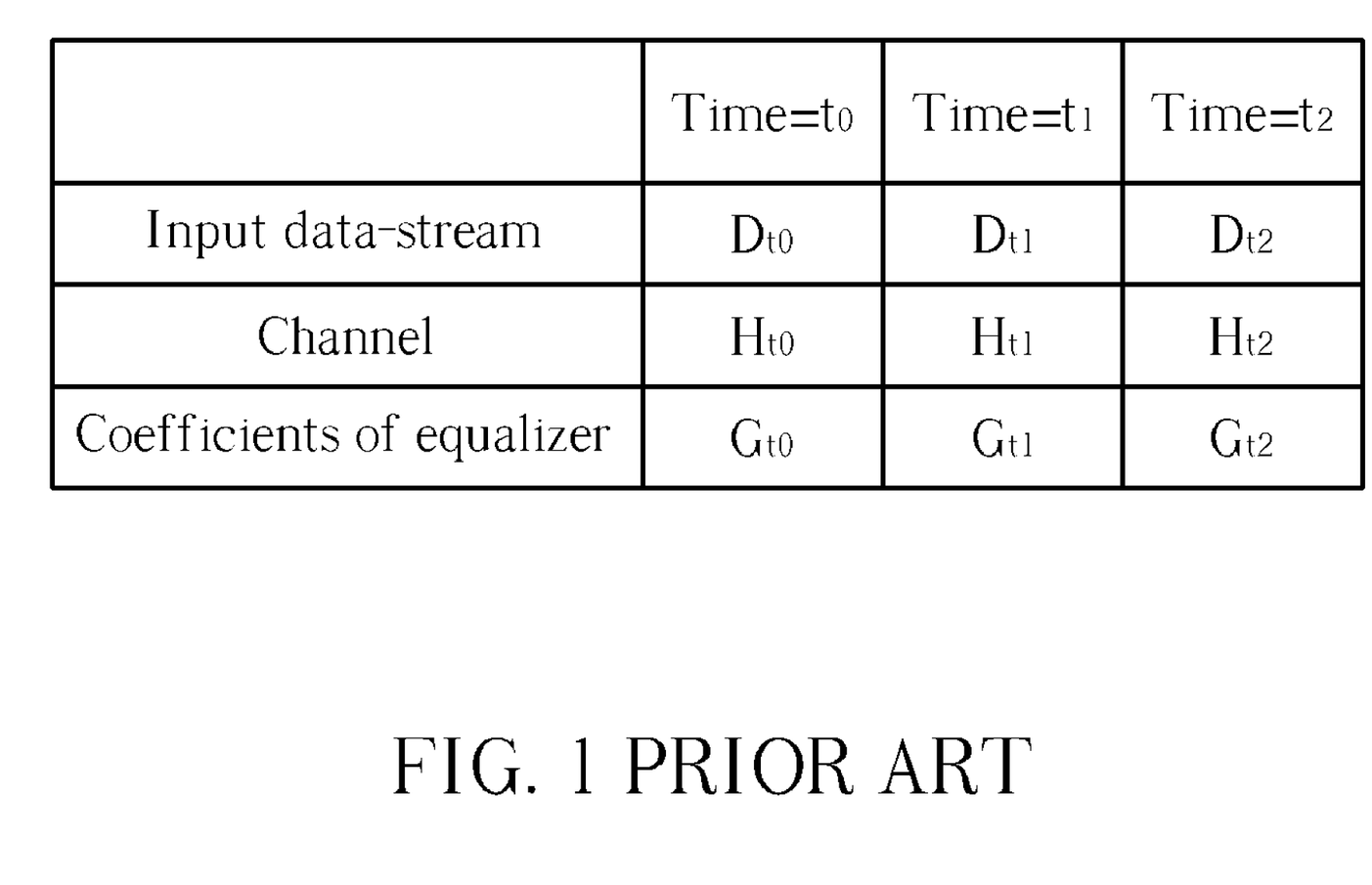
FIG. 1 is a diagram showing a relationship table between input data-stream, channels, and coefficient of an equalizer according to the prior art.

Please refer to FIG. 1. FIG. 1 is a diagram showing a relationship table between input data-stream, channels, and coefficient of an equalizer according to the prior art. As shown in FIG. 1, $D_{r0}$, $D_{r1}$, and $D_{r2}$ respectively represent the input data-streams at time $t_0$, $t_1$, and $t_2$. $H_{r0}$, $H_{r1}$, and $H_{r2}$ respectively represent the channels at the time $t_0$, $t_1$, and $t_2$. $G_{r0}$, $G_{r1}$, and $G_{r2}$ respectively represent coefficients of an equalizer at the time $t_0$, $t_1$, and $t_2$. In theory, the equations listed in the following should come into existence.

$$G_{r0} \times H_{r0} = 1 \quad (1)$$

$$G_{r1} \times H_{r1} = 1 \quad (2)$$

$$G_{r2} \times H_{r2} = 1 \quad (3)$$

However, it takes time to train the training sequence component of the input data-stream to be able to obtain the coefficients of the equalizer. For example, the training sequence component of the input data-stream $D_{r0}$ is trained at the time $t_0$, and after a time interval (such as at the time $t_1$) the coefficient of the equalizer $G_{r0}$ is obtained. At this time $t_1$, if the coefficient of the equalizer $G_{r0}$ is used for reducing ISI of the current input data-stream $D_{r1}$, the equations above fail due to $H_{r0} \neq H_{r1}$ and $G_{r0} \times H_{r1} \neq 1$.

Such method called data recycling performs well in a static channel, which can effectively reduce the convergence time of the adaptive equalizer. But, if the channel is a dynamic channel or a mobile channel, which means the channel changes following with movements of users or alternations of environments (i.e., the channel is time-variant), coefficients obtained from conventional data recycling technology can't conform to practical situations. So conventional data recycling technology does not perform well and needs to be improved.

SUMMARY OF THE INVENTION

It is one of the objectives of the claimed invention to provide a method applied to an equalizer for reducing inter-symbol interference (ISI) to solve the abovementioned problems.

According to one embodiment, a method applied to an equalizer is provided for reducing ISI. The method includes receiving an input data-stream having a training sequence component with a first number of symbols and a data component with a second number of symbols, wherein the first number plus the second number equals a third number; when a symbol number of the input data-stream is not greater than the first number, training the training sequence component to generate a first trained coefficient set and storing the training sequence component; when the symbol number of the input data-stream is greater than the first number and not greater than the third number, recycling the training sequence component to generate a recycled training sequence component, and training the recycled training sequence component to generate a second trained coefficient set; storing the training sequence component and the data component to generate a delayed input data-stream when the symbol number of the input data-stream is not greater than the third number; and applying the second trained coefficient set to the equalizer to reduce ISI of the delayed input data-stream when the symbol number of the input data-stream is greater than the third number.

According to another embodiment, an inter-symbol interference (ISI) reduction apparatus applied to an equalizer is provided. The ISI reduction apparatus includes a receiver, a training module, a storage, a recycling module, and an equalizer. The receiver is used for receiving an input data-stream having a training sequence component with a first number of symbols and a data component with a second number of symbols, wherein the first number plus the second number equals a third number. The training module is coupled to the receiver for training the training sequence component to generate a first trained coefficient set when a symbol number of the input data-stream is not greater than the first number, and for training a recycled training sequence component to generate a second trained coefficient set when the symbol number of the input data-stream is greater than the first number and not greater than the third number. The storage is coupled to the receiver for storing the training sequence component when the symbol number of the input data-stream is not greater than the first number, and for storing the training sequence component and the data component to generate a delayed input data-stream when the symbol number of the input data-stream is not greater than the third number. The recycling module is coupled between the storage and the training module for recycling the training sequence component to generate a recycled training sequence component when the symbol number of the input data-stream is greater than the first number and not greater than the third number. The equalizer is coupled to the receiver, the training module, the storage, and the recycling module. The equalizer is used for applying the second trained coefficient set to the equalizer to reduce ISI of the delayed input data-stream when the symbol number of the input data-stream is greater than the third number.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 2:
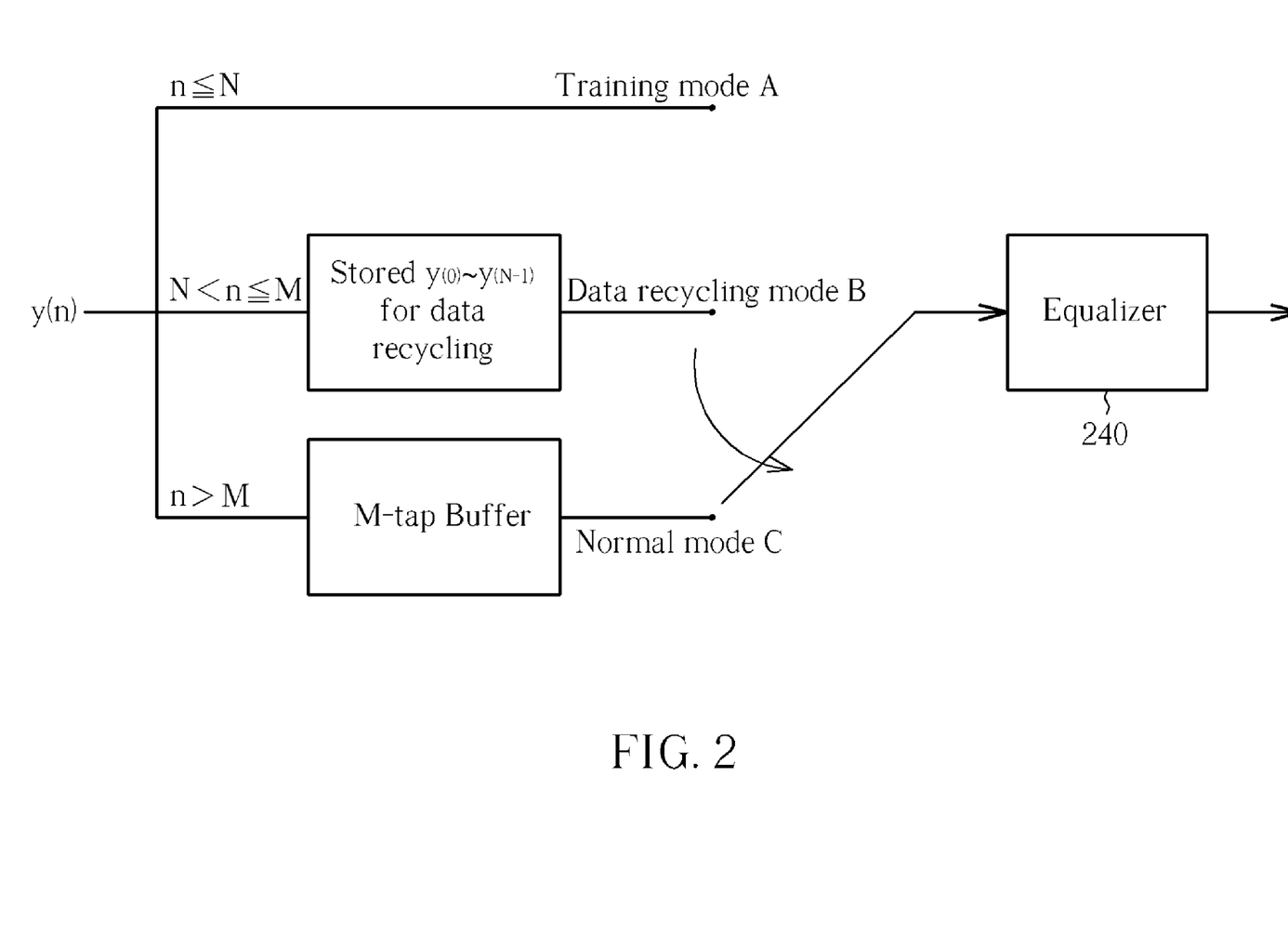
FIG. 2 is a diagram illustrating different operating modes of an equalizer according to an embodiment of the present invention.

Please refer to FIG. 2. FIG. 2 is a diagram illustrating different operating modes of an equalizer according to an embodiment of the present invention. As shown in FIG. 2, y(n) represents an input data-stream of the equalizer 240, wherein the input data-stream y(n) has a training sequence component TS with N symbols and a data component DA with (M-N) symbols. M and N are both integers, and N is smaller than M. In the following, descriptions of the operating modes of the equalizer 240 are divided into three situations for further illustration.

In a first situation, a training mode A is adopted when a symbol number n of the input data-stream y(n) is not greater than N (i.e., $n \leq N$). During the training mode A, the training sequence component TS is trained to generate a first trained coefficient set TC1 and the training sequence component TS is stored. At this time, the first trained coefficient set TC1 is applied to the equalizer 240 to reduce ISI of the training sequence component TS.

In a second situation, a data recycling mode B is adopted when the symbol number n of the input data-stream y(n) is greater than N and not greater than M (i.e., $N < n \leq M$). During the data recycling mode B, the training sequence component TS is recycled to generate a recycled training sequence component TS', and the recycled training sequence component TS' is trained to generate a second trained coefficient set TC2. At this time, the second trained coefficient set TC2 is applied to the equalizer 240 to reduce ISI of the recycled training sequence component TS'. Besides, the training sequence component TS and the data component DA are stored to generate a delayed input data-stream $y_2(n)$ when the symbol number n of the input data-stream y(n) is not greater than the third number (i.e., $n \leq M$).

In a third situation, a normal mode C is adopted when the symbol number n of the input data-stream y(n) is greater than the third number (i.e., n>M). During the normal mode C, the second trained coefficient set TC2 is applied to the equalizer 240 to reduce ISI of the delayed input data-stream $y_2(n)$.

Figure 3:
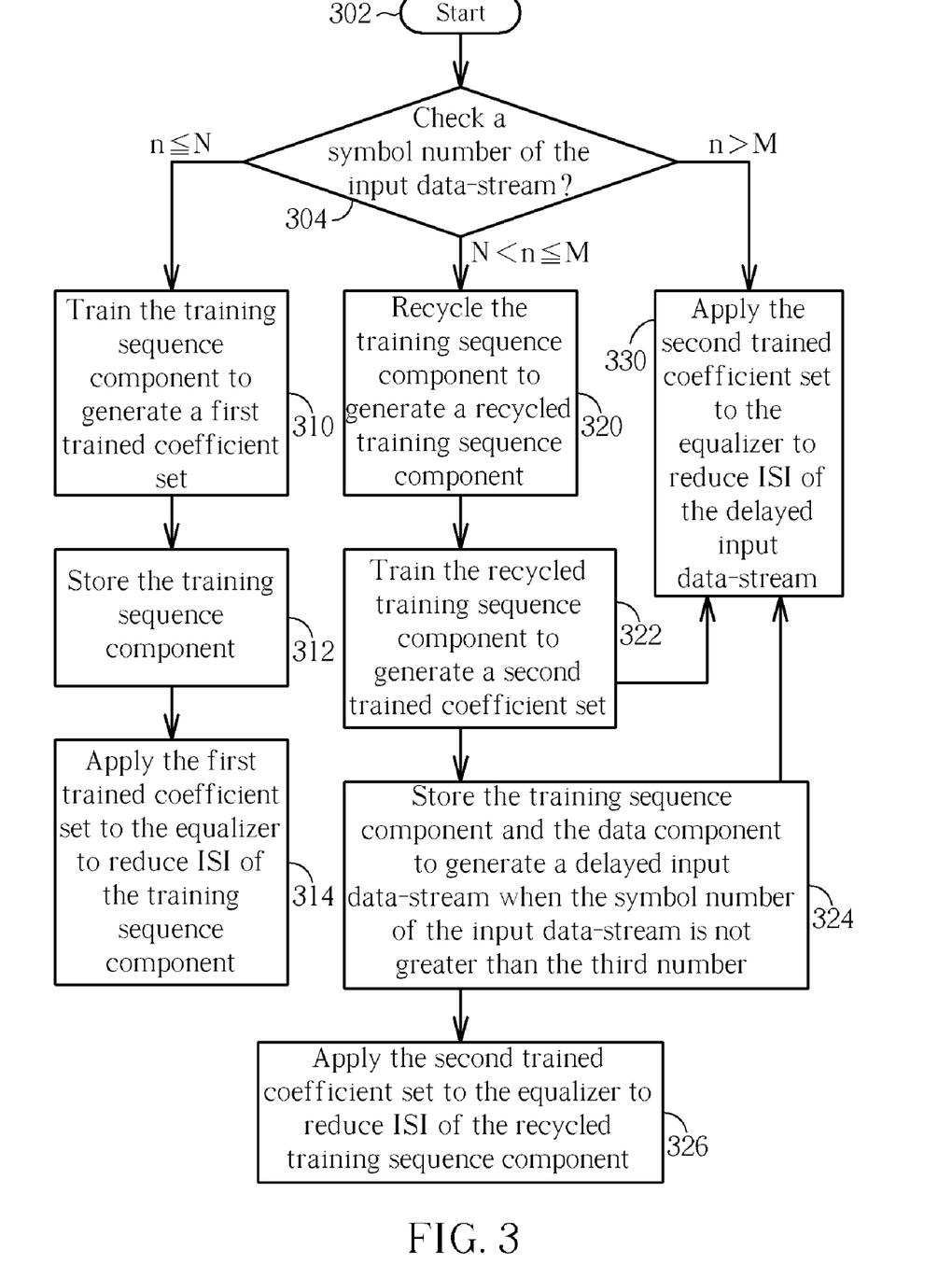
FIG. 3 is a flowchart illustrating a method applied to an equalizer for reducing inter-symbol interference according to an embodiment of the present invention.

Please refer to FIG. 3. FIG. 3 is a flowchart illustrating a method applied to an equalizer for reducing inter-symbol interference according to an embodiment of the present invention. The method includes, but is not limited to, the following steps:

Step 302: Start.

Step 304: Check a symbol number of the input data-stream. If the symbol number of the input data-stream is not greater than N, go to Step 310; if the symbol number of the input data-stream is greater than N and not greater than M, go to Step 320; otherwise, go to Step 330.

Step 310: Train the training sequence component to generate a first trained coefficient set.

Step 312: Store the training sequence component.

Step 314: Apply the first trained coefficient set to the equalizer to reduce ISI of the training sequence component.

Step 320: Recycle the training sequence component to generate a recycled training sequence component.

Step 322: Train the recycled training sequence component to generate a second trained coefficient set.

Step 324: Store the training sequence component and the data component to generate a delayed input data-stream when the symbol number of the input data-stream is not greater than the third number.

Step 326: Apply the second trained coefficient set to the equalizer to reduce ISI of the recycled training sequence component.

Step 330: Apply the second trained coefficient set to the equalizer to reduce ISI of the delayed input data-stream when the symbol number of the input data-stream is greater than the third number.

Please note that, the method shown in FIG. 3 is just a practicable embodiment, not limiting conditions of the present invention. And, the order of the steps merely represents a superior embodiment of the method of the present invention. In other words, the illustrated order of steps can be changed based on the conditions, and is not limited to the above-mentioned order. For example, Step 310 and Step 312 can be combined into one step, or Step 320 and Step 322 can be combined into another step.

Figure 4:
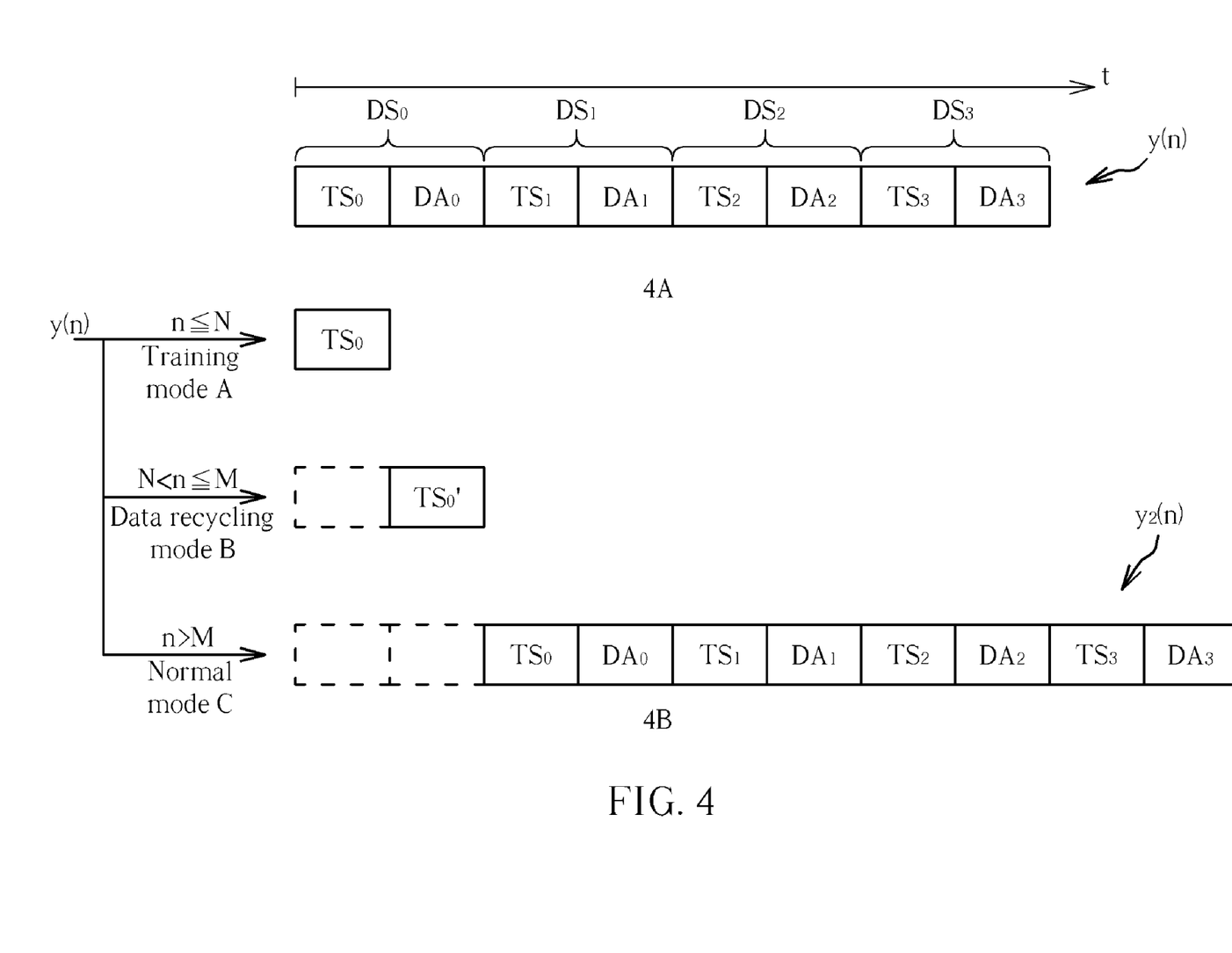
FIG. 4 is a diagram showing a data structure of the input data-stream in different operating modes shown in FIG. 2.

Please refer to FIG. 4 and FIG. 2. FIG. 4 is a diagram showing a data structure of the input data-stream in different operating modes shown in FIG. 2. As shown in sub-diagram 4A, $DS_0$, $DS_1$, $DS_2$, and $DS_3$ respectively represent data streams included in the input data-stream y(n) at the time $t_0$, $t_1$, $t_2$ and $t_3$, wherein each of the data stream has a training sequence component (i.e., $TS_0$, $TS_1$, $TS_2$, and $TS_3$) with N symbols and a data component (i.e., $DA_0$, $DA_1$, $DA_2$, and $DA_3$) with (M-N) symbols.

Please keep referring to FIG. 4 and FIG. 2. As shown in sub-diagram 4B, when $n \leq N$ (i.e., the training mode A), the training sequence component $TS_0$ is trained to generate the first trained coefficient set TC1 and the training sequence component $TS_0$ is stored. When $N < n \leq M$ (i.e., the data recycling mode B), the training sequence component $TS_0$ is recycled to generate a recycled training sequence component $TS_0'$, and the recycled training sequence component $TS_0'$ is trained to generate the second trained coefficient set TC2. When n>M (i.e., the normal mode C), the second trained coefficient set TC2 is applied to the equalizer 240 to reduce ISI of the delayed input data-stream $y_2(n)$.

Please note that, when n=M+1, the equalizer 240 is firstly switched to the normal mode C. At this time, the data stream $DS_0$ of the delayed input data-stream $y_2(n)$ is used as the input signal of the equalizer 240. Because the training sequence component $TS_0$ is used for training during the training mode A and the data recycling mode B, the second trained coefficient set TC2 is exactly suitable for processing data stream $DS_0$. Similarly, if the training sequence component $TS_1$ is used for training during the training mode A and the data recycling mode B, the corresponding trained coefficient set is applied to the equalizer 240 to reduce ISI of the data stream $DS_1$ of the delayed input data-stream $y_2(n)$ during the normal mode C.

Figure 5:
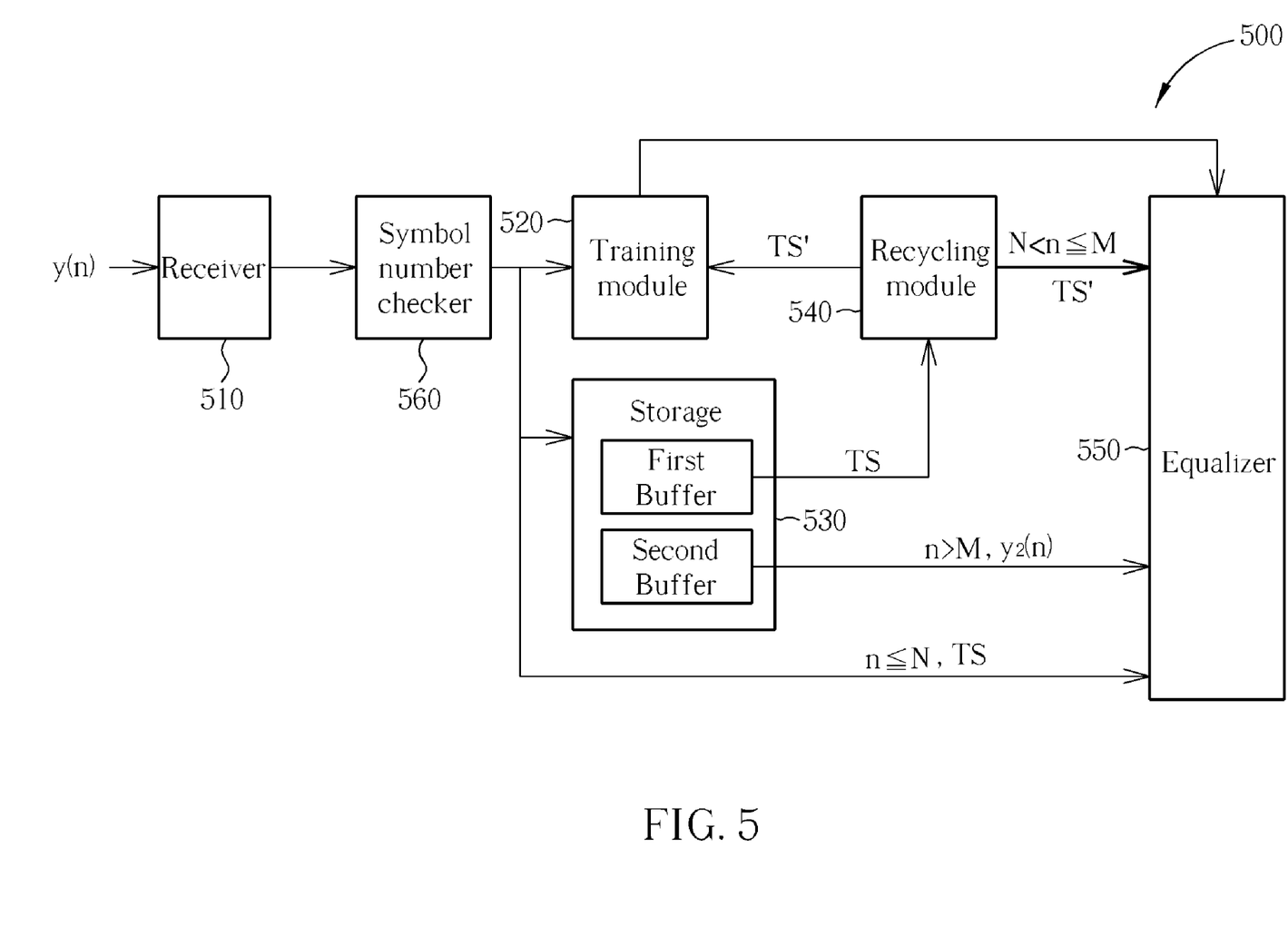
FIG. 5 is a block diagram of an ISI reduction apparatus applied to an equalizer according to an embodiment of the present invention.

Please refer to FIG. 5. FIG. 5 is a block diagram of an ISI reduction apparatus 500 applied to an equalizer according to an embodiment of the present invention. The ISI reduction apparatus 500 includes, but is not limited to, a receiver 510, a symbol number checker 560, a training module 520, a storage 530, a recycling module 540, and an equalizer 550. The receiver 510 is used for receiving an input data-stream y(n) having the training sequence component TS with N symbols and the data component DA with (M-N) symbols. The symbol number checker 560 is coupled to the receiver 510 for checking the symbol number n of the input data-stream y(n). The training module 520 is coupled to the symbol number checker 560. The storage 530 is coupled to the symbol number checker 560. The storage 530 includes a first buffer 532 for storing the training sequence component TS when $n \leq N$, and a second buffer 534 for storing the training sequence component TS and the data component DA to generate a delayed input data-stream $y_2(n)$ when $n \leq M$. The recycling module 540 is coupled between the storage 530 and the training module 520. The equalizer 550 is coupled to the receiver 510, the training module 520, the storage 530, and the recycling module 540.

In the following description, the components shown in FIG. 5 are collocated with the steps shown in FIG. 3 and the operating modes of the equalizer shown in FIG. 2 for further detailed descriptions of operating manners.

In Step 304, the symbol number n of the input data-stream y(n) is checked by the symbol number checker 560. In the following, descriptions are divided into three cases. In a first case, if the symbol number n of the input data-stream y(n) is not greater than N (refer to Steps 310-314), the training mode A is adopted. At this time, the training sequence component TS is trained by the training module 520 to generate a first trained coefficient set TC1 (Step 310) and the training sequence component TS is stored into the first buffer 532 (Step 312). In Step 314, the first trained coefficient set TC1 is applied to the equalizer 530 to reduce ISI of the training sequence component TS. In a second case, if the symbol number n of the input data-stream y(n) is greater than N and not greater than M (refer to Steps 320-326), the data recycling mode B is adopted. At this time, the training sequence component TS is recycled by the recycling module 540 to generate a recycled training sequence component TS' (Step 320) and the recycled training sequence component TS' is trained by the training module 520 to generate a second trained coefficient set TC2 (Step 322). Besides, the training sequence component TS and the data component DA are stored into the second buffer 534 to generate the delayed input data-stream $y_2(n)$ when the symbol number n of the input data-stream y(n) is not greater than M (Step 324). In Step 326, the second trained coefficient set TC2 is applied to the equalizer 530 to reduce ISI of the recycled training sequence component TS'. In a third case, if the symbol number n of the input data-stream y(n) is greater than M (refer to Step 330), the normal mode C is adopted. At this time, the second trained coefficient set TC2 is applied to the equalizer 550 to reduce ISI of the delayed input data-stream $y_2(n)$ when the symbol number n of the input data-stream y(n) is greater than M (Step 330).

In one embodiment, the equalizer 550 is implemented by using a decision feedback equalizer (DFE) with LMS algorithm, but is not limited to this implementation only and can be equalizers of other types depending upon design requirements. The first trained coefficient set and the second coefficient set are generated by the LMS algorithm. In short, any equalizer employing the aforementioned inter-symbol interference (ISI) reduction technique of the present invention falls in the scope of the present invention. Furthermore, the storage 530 can be a buffer, but is not limited to this only and can be other types of storage devices. The symbol number checker 560 can be implemented by a comparator, but should not be a limitation of the present invention.

In one embodiment, the input data-stream y(n) complies with an advanced television system committee (ATSC) standard. Those skilled in the art should readily appreciate that these are not limitations of the present invention, and the input data-stream y(n) can comply with other types of television broadcasting formats.

Figure 6:
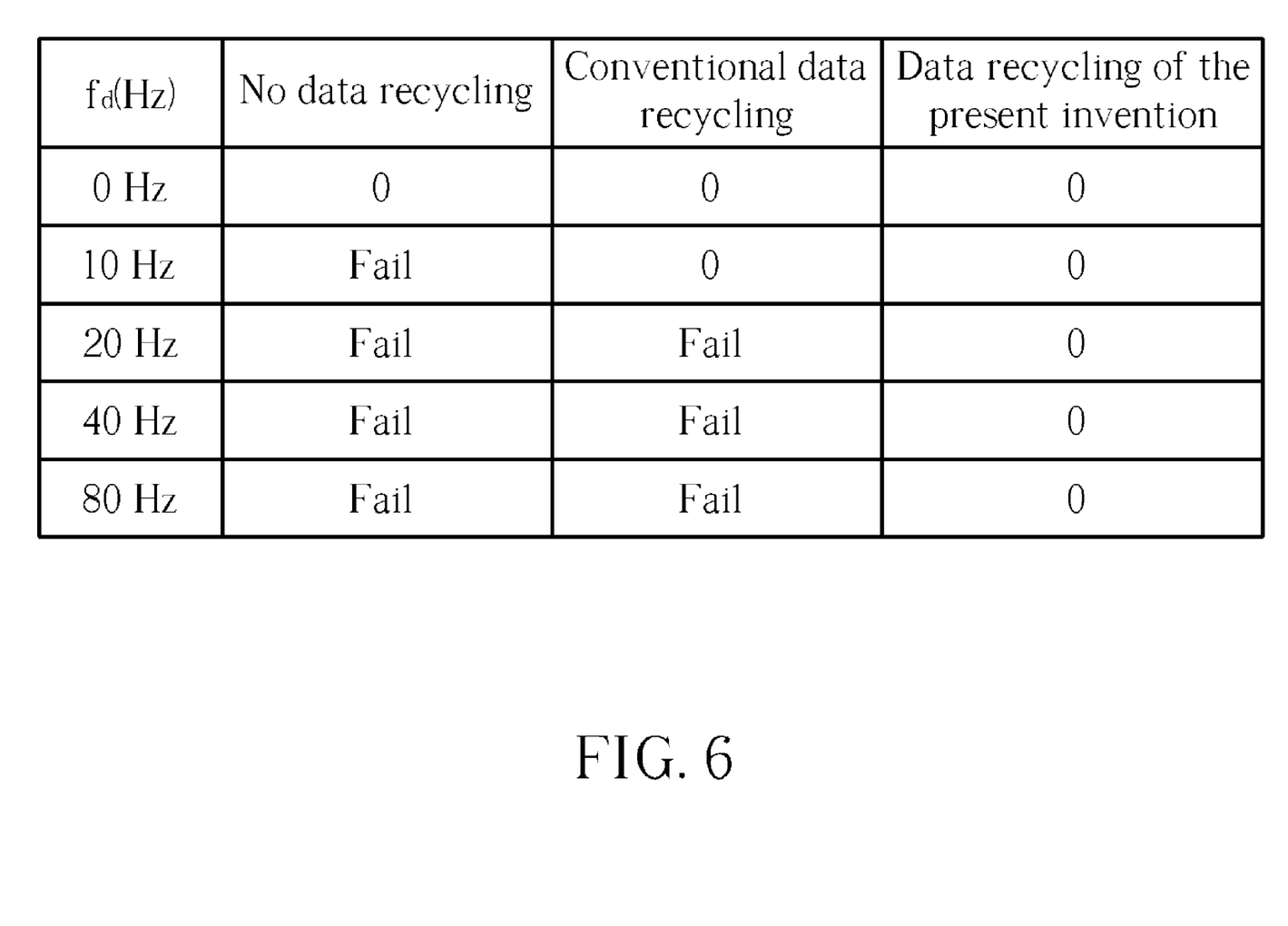
FIG. 6 is a diagram showing a table presenting performance comparison between training mechanisms applied to an equalizer in the prior art and disclosed in the present invention.

Please refer to FIG. 6. FIG. 6 is a diagram showing a table presenting performance comparison between training mechanisms applied to an equalizer in the prior art and disclosed in the present invention. Taking an ATSC signal generated by a digital TV signal generator of Rhode Schwartz for example, its multi-pulse response setting with multi-path channel is listed as below:

$$h(t) = \delta(t) + 0.1 \times \cos(2\pi f_d t) \times \delta(t - 5 \ \mu s) \quad (4)$$

The abovementioned equation is used for verifying ATSC performance, wherein $f_d$ is Doppler shift frequency and represents the frequency of alternations in the channel. In FIG. 6, the bit error rate of the channel under three different training mechanisms is listed.

As can be seen from the table in FIG. 6, if no data recycling technology is used for training the ATSC signal, its bit error rate is 0 only when the Doppler shift frequency $f_d$ is equal to 0 Hz. As the Doppler shift frequency $f_d$ increases ($f_d$=10 Hz~80 Hz), its bit error rate is too larger and fails the result. If the conventional data recycling technology is used for training the ATSC signal, its bit error rate is 0 only when the Doppler shift frequency $f_d$ is equal to 0 Hz or 10 Hz. As the Doppler shift frequency $f_d$ increases ($f_d$=20 Hz~80 Hz), its bit error rate is too larger and fails the result. If the data recycling technology disclosed in the present invention is used for training the ATSC signal, its bit error rate maintains at 0 no matter how the Doppler shift frequency $f_d$ increases. In other words, the bit error rate can be substantially improved by using the data recycling technology disclosed in the present invention, especially in a dynamic channel or a mobile channel.

The abovementioned embodiments are presented merely for describing features of the present invention, and in no way should be considered to be limitations of the scope of the present invention. In one embodiment, the equalizer 500 is a DFE with LMS algorithm, but is not limited to this configuration only and can be implemented using equalizers of other types. Furthermore, the storage 530 can be a buffer, but is not limited to this only and can be other types of storage devices. Please note that, the method shown in FIG. 3 is just a practicable embodiment, not limiting conditions of the present invention. Those skilled in the art should readily appreciate that the order of steps can be changed based on the conditions, and is not limited to the above-mentioned order. In addition, the input data-stream y(n) can comply with an ATSC standard. Those skilled in the art should readily appreciate that these are not limitations of the present invention, and the input data-stream y(n) can comply with other types of television broadcasting formats.

In summary, the present invention provides a method applied to an equalizer for reducing ISI and related ISI reduction apparatus. Through the training mechanism disclosed in the present invention, three different operating modes (i.e., the training mode A, the data recycling mode B, and the normal mode C) of the equalizer can be switched depending on the tap number n of the input data-stream y(n). Because it takes time to train the training sequence component of the input data-stream to be able to obtain the coefficients of the equalizer, the delayed input data-stream $y_2(n)$ can be obtained through using the storage to store and delay the input data-stream y(n). Therefore, after a time interval of finishing training the training sequence component of the input data-stream, the trained coefficient set is exactly suitable for applying to the equalizer to reduce ISI of the delayed input data-stream $y_2(n)$. Thereby the bit error rate can be substantially improved by using the data recycling technology disclosed in the present invention. In other words, the data recycling technology disclosed in the present invention has better performance than conventional data recycling technology, especially in a dynamic channel or a mobile channel.

Those skilled in the art will readily observe that numerous modifications and alterations of the device and method may be made while retaining the teachings of the invention.

What is claimed is:

1. A method applied to an equalizer for reducing inter-symbol interference (ISI), comprising:
    receiving an input data-stream having a training sequence component with a first number of symbols and a data component with a second number of symbols, wherein the first number plus the second number equals a third number;
    when a symbol number of the input data-stream is not greater than the first number, training the training sequence component to generate a first trained coefficient set and storing the training sequence component;
    when the symbol number of the input data-stream is greater than the first number and not greater than the third number, recycling the training sequence component to generate a recycled training sequence component, and training the recycled training sequence component to generate a second trained coefficient set;
    storing the training sequence component and the data component to generate a delayed input data-stream when the symbol number of the input data-stream is not greater than the third number; and
    applying the second trained coefficient set to the equalizer to reduce ISI of the delayed input data-stream when the symbol number of the input data-stream is greater than the third number.

2. The method of claim 1, further comprising:
    checking the symbol number of the input data-stream.

3. The method of claim 2, wherein the step of checking the symbol number of the input data-stream comprises:
    comparing the symbol number of the input data-stream with the first number and the third number.

4. The method of claim 1, wherein the third number is greater than the first number.

5. The method of claim 1, wherein:
    the step of storing the training sequence component comprises:
    buffering and delaying the training sequence component for a symbol number equaling the first number; and
    the step of storing the training sequence component and the data component to generate the delayed input data-stream comprises:
    buffering and delaying the training sequence component and the data component for a symbol number equaling the third number to generate the delayed input data-stream.

6. The method of claim 1, further comprising:
    applying the first trained coefficient set to the equalizer to reduce ISI of the training sequence component.

7. The method of claim 1, further comprising:
    applying the second trained coefficient set to the equalizer to reduce ISI of the recycled training sequence component.

8. The method of claim 1, wherein the equalizer is an adaptive decision feedback equalizer with LMS (least mean square) algorithm.

9. The method of claim 1, wherein the input data-stream complies with an advanced television system committee (ATSC) standard.

10. An inter-symbol interference (ISI) reduction apparatus applied to an equalizer comprising:
    a receiver, for receiving an input data-stream having a training sequence component with a first number of symbols and a data component with a second number of symbols, wherein the first number plus the second number equals a third number;
    a training module, coupled to the receiver, for training the training sequence component to generate a first trained coefficient set when a symbol number of the input data-stream is not greater than the first number, and for training a recycled training sequence component to generate a second trained coefficient set when the symbol number of the input data-stream is greater than the first number and not greater than the third number;
    a storage, coupled to the receiver, for storing the training sequence component when the symbol number of the input data-stream is not greater than the first number, and for storing the training sequence component and the data component to generate a delayed input data-stream when the symbol number of the input data-stream is not greater than the third number;
    a recycling module, coupled between the storage and the training module, for recycling the training sequence component to generate a recycled training sequence component when the symbol number of the input data-stream is greater than the first number and not greater than the third number; and
    an equalizer, coupled to the receiver, the training module, the storage, and the recycling module, for applying the second trained coefficient set to the equalizer to reduce ISI of the delayed input data-stream when the symbol number of the input data-stream is greater than the third number.

11. The ISI reduction apparatus of claim 10, further comprising:
    a symbol number checker, coupled to the receiver, for checking the symbol number of the input data-stream.

12. The ISI reduction apparatus of claim 11, wherein the symbol number checker is a comparator, for comparing the symbol number of the input data-stream with the first number and the third number.

13. The ISI reduction apparatus of claim 10, wherein the third number is greater than the first number.

14. The ISI reduction apparatus of claim 10, wherein the storage comprises:
- a first buffer, for storing the training sequence component when the symbol number of the input data-stream is not greater than the first number; and
- a second buffer, for storing the training sequence component and the data component to generate a delayed input data-stream when the symbol number of the input data-stream is not greater than the third number.

15. The ISI reduction apparatus of claim 14, wherein:
a tap length of the first buffer is the first number; and
a tap length of the second buffer is the third number.

16. The ISI reduction apparatus of claim 10, wherein the equalizer is further used for applying the first trained coefficient set to the equalizer to reduce ISI of the training sequence component.

17. The ISI reduction apparatus of claim 10, wherein the equalizer is further used for applying the second trained coefficient set to the equalizer to reduce ISI of the recycled training sequence component.

18. The ISI reduction apparatus of claim 10, wherein the equalizer is an adaptive decision feedback equalizer with LMS algorithm.

19. The ISI reduction apparatus of claim 10, wherein the input data-stream complies with an advanced television system committee (ATSC) standard.

* * * * *